United States Patent

Huynh et al.

Patent Number: 6,134,882
Date of Patent: Oct. 24, 2000

[54] REGULATING STRATEGY FOR AN NOX TRAP

[75] Inventors: Ngoc-Hoa Huynh, Leonberg; Lorenz K. F. Salzer, Rutesheim; Ralph Stetter, Remshalden, all of Germany

[73] Assignees: Dr. Ing. h.c.F. Porsche AG, Weissach; DaimlerChrysler AG, Stuttgart; Bayerische Motoren Werke Aktiengesellschaft, Munich, all of Germany

[21] Appl. No.: 09/334,609

[22] Filed: Jun. 17, 1999

[30] Foreign Application Priority Data

Jun. 20, 1998 [DE] Germany ............ 198 27 420

[51] Int. Cl.7 .................................... F01N 3/00
[52] U.S. Cl. ............... 60/274; 60/286; 60/295; 60/303
[58] Field of Search ............. 60/274, 285, 286, 60/295, 276, 301, 303, 297

[56] References Cited

U.S. PATENT DOCUMENTS

| | | | |
|---|---|---|---|
| 5,546,910 | 8/1996 | Messih et al. | |
| 5,564,393 | 10/1996 | Asano et al. | 123/492 |
| 5,690,087 | 11/1997 | Schumacher et al. | 123/675 |
| 5,771,685 | 6/1998 | Hepburn | 60/274 |
| 5,974,791 | 11/1999 | Hirota et al. | 60/276 |
| 6,023,929 | 2/2000 | Ma | 60/295 |

FOREIGN PATENT DOCUMENTS 196 53 756 C2  6/1998  Germany.

Primary Examiner—Thomas Denion
Assistant Examiner—Binh Tran
Attorney, Agent, or Firm—Evenson, McKeown, Edwards & Lenahan, P.L.L.C.

[57] ABSTRACT

A method for operating an NOx trap for an internal combustion engine includes measuring parameters that influence the delay between the metering of a regenerating agent and its becoming effective in regenerating the NOx trap. Such parameters include the fuel film on an intake wall and the quantity of oxygen bonded in the catalytic converters upstream of the NOx trap. Measuring these parameters helps determine the quantity of regenerating agent or the number of working cycles required for regeneration of the NOx trap.

5 Claims, 1 Drawing Sheet

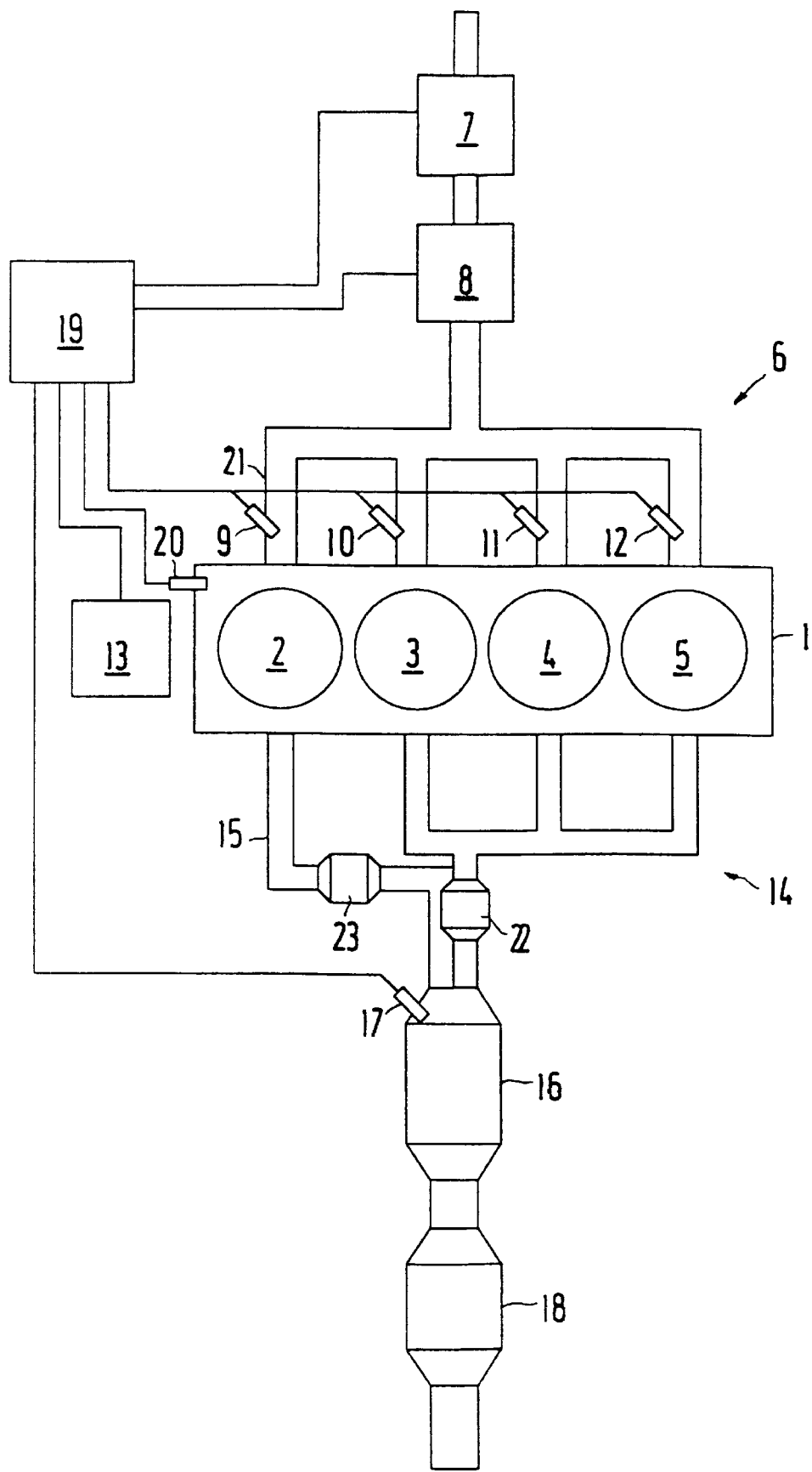

REGULATING STRATEGY FOR AN NOX TRAP

BACKGROUND AND SUMMARY OF THE INVENTION

This application claims the priority of German Patent Application No. 198 27 420.3, filed Jun. 20, 1998, the disclosure of which is expressly incorporated by reference herein.

The present invention relates to a method for operating an NOx trap for an internal combustion engine.

DE 196 53 756 discloses a control device for operating an NOx trap for an internal combustion engine. The control device determines the metering of a regenerating agent on the basis of individual working cycles of the engine.

It is a goal of the present invention to provide a method for operating an NOx trap for an internal combustion engine with metering of the regenerating agent. For this purpose, provision is made (1) for determining the number of working cycles required for regeneration of the NOx trap, which corresponds to metering of fuel as the regenerating medium; and (2) for taking into account additional parameters that influence the delay between the metering of the regenerating medium and its becoming effective in regenerating the NOx trap. Thus, consideration is given to the fact that the fuel initially supplied for regeneration is not in fact available for regeneration of the NOx trap, but instead forms a fuel film on a wall in an intake channel to the engine and breaks down the oxygen that is bonded in catalytic converters upstream of the NOx trap and possibly in the NOx trap itself.

The present invention takes these parameters into account (e.g., fuel film on a wall, quantity of bonded oxygen) in determining the number of working cycles required for regeneration of the NOx trap. Alternatively, it is possible to feed fuel into the combustion chamber by direct fuel injection using the control device according to the present invention, thereby not forming a fuel film on an intake wall. Alternatively or in addition, a catalytic converter can be located upstream of the NOx trap when using the control device according to the present invention. The quantity of oxygen that can be stored in the catalytic converter is minimized. In the most favorable case, the catalytic converter has no ability to store oxygen. The present invention can be used for both diesel and gasoline engines.

Other objects, advantages and novel features of the present invention will become apparent from the following detailed description of the invention when considered in conjunction with the accompanying drawing.

BRIEF DESCRIPTION OF THE DRAWING

The sole FIGURE is a schematic diagram of an internal combustion engine having a control device according to the present invention.

DETAILED DESCRIPTION OF THE DRAWING

An internal combustion engine 1 with four cylinders 2 to 5 has an intake system 6 with an airflow sensor 7 and a throttle sensor 8. Injection valves 9 to 12 are provided upstream from the individual cylinders 2 to 5 for metering the fuel. A crankshaft sensor 13 is also provided on engine 1.

On the exhaust side, engine 1 has an exhaust system 14 in which a separate exhaust line 15 is provided for the first cylinder 2. The separate exhaust line 15 terminates together with the remainder of exhaust system 14 in a NOx trap 16.

A probe 17 is located in the inlet area of the NOx trap 16. The probe determines the excess oxygen in the exhaust. Finally, a catalytic converter 18 is connected downstream of the NOx trap 16.

A control device 19 receives the signals from airflow sensor 7, throttle sensor 8, crankshaft sensor 13, and probe 17. Control device 19 controls the metering of fuel to engine 1 individually to the cylinders through injectors 9 to 12.

During operation, in other words with engine 1 warmed up and with normal operation apart from maximum states such as idle or full load for example, the fuel is metered by control device 19 in such fashion that engine 1 is operated with surplus air. In this first operating mode, NOx trap 16 adsorbs NOx from the exhaust.

Control device 19 records the number of working cycles, in this case the number of combustion cycles of internal combustion engine 1, in order to control the load in the NOx trap 16. For one revolution of the crankshaft (not shown) of engine 1, two combustion cycles are completed, in other words two working cycles are counted. After the completion of each 28 working cycles, counting all cylinders 2 to 5, the control device 19 increases the quantity of fuel supplied to the first cylinder 2 so that in this case, during the following working cycle, the first cylinder 2 operates with a fuel surplus and unburned fuel is conducted into the separate exhaust line 15. This exhaust volume passes through the separate exhaust line 15, without mixing, to the NOx trap 16 which, as a consequence of the change in the concentration of its components, now releases the NOx stored in the NOx trap. The NOx thus freed then passes with the unburned fuel into catalytic converter 18 and is reduced therein.

Control device 19 also receives a signal from an engine temperature sensor 20 mounted on engine 1. With the aid of this temperature signal as well as additional operating parameters of engine 1, control device 19 determines in a manner known the formation of a fuel film on a wall of intake system 6 in the area downstream from injectors 9 to 12. See U.S. Pat. No. 5,546,910, the entirety of which is incorporated herein by reference. In the present case, this is important primarily for an intake manifold 21 that leads to the first cylinder 2 to which the surplus fuel described above is delivered via the first Injector 9. This additionally provided fuel however is partially used to build up the fuel film on the intake wall. For this reason, control device 19 controls Injector 9 such that the amount of fuel required for regeneration of NOx trap 16, even taking into account the amount used for forming the fuel film on the wall, always enters exhaust line 15 in a sufficient quantity. Instead of changing the amount of fuel supplied, as an alternative or in addition, the number of working cycles until the next increase in the volume of fuel supplied can be changed. Thus, a reduction in the number of work cycles corresponds to an increase in the quantity of fuel supplied.

Exhaust system 14 has a primary converter 22 located upstream of NOx trap 16. A separate primary catalytic converter 23 is provided for the separate exhaust line 15. The second primary converter 23 in particular is designed so that its oxygen storage capacity is as small as possible since otherwise oxygen stored in the second primary converter would produce an additional reduction of the unburned fuel supplied through separate exhaust line 15. In addition, the oxygen storage capacity of NOx trap 16 should be minimized when the coating on the NOx trap 16 also has catalytic properties in addition to its adsorbent properties. Since the unburned fuel reaches NOx trap 16 exclusively through the separate exhaust line 15, the oxygen storage capacity of the first primary converter 22 is important in the present example.

If the oxygen storage capacity of the second primary converter 23 cannot be suppressed to the extent necessary, Control device 19 may, while metering the additional quantity of fuel through the first Injector 9 or the number of working cycles, also to take into account the quantity of fuel needed to break down the oxygen stored in primary converter 23 so that a sufficient quantity of unburned fuel can reach NOx trap 16. For example, the composition of primary converter 23 may be measured to determine the amount of stored or bonded oxygen.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regenerating an NOx trap for an internal combustion engine, comprising:

measuring a number of working cycles of the internal combustion engine;

measuring an amount of a fuel film on an intake wall of the internal combustion engine;

increasing an amount of fuel supplied to the internal combustion engine, thereby generating exhaust containing unburnt fuel; and feeding the exhaust containing unburnt fuel to the NOx trap, thereby regenerating the NOx trap.

2. A method according to claim 1, further comprising measuring a quantity of oxygen bonded in a catalytic converter upstream of the NOx trap.

3. A method according to claim 2, further comprising minimizing the quantity of oxygen stored in the catalytic converter.

4. A method according to claim 3, wherein said increasing comprises direct fuel injection into a combustion chamber of the internal combustion engine.

5. A control device for regenerating an NOx trap for an internal combustion engine, comprising:

means for measuring a number of working cycles of the internal combustion engine;

means for measuring an amount of a fuel film on an intake wall of the internal combustion engine;

means for increasing an amount of fuel supplied to the internal combustion engine, thereby generating exhaust containing unburnt fuel; and means for feeding the exhaust to the NOx trap, thereby regenerating the NOx trap.

\* \* \* \* \*